(12) United States Patent
Oser et al.

(10) Patent No.: US 6,467,599 B2
(45) Date of Patent: Oct. 22, 2002

(54) DEVICE FOR DAMPING TORSIONAL VIBRATIONS

(75) Inventors: Reinhold Oser, Achern-Wagshurst; Albert Birk, Bühl-Vimbuch, both of (DE)

(73) Assignee: LuK Lamellen und Kupplungsbau Beteiligungs KG, Buhl/Baden (DE)

( * ) Notice: Subject to any disclaimer, the term of this patent is extended or adjusted under 35 U.S.C. 154(b) by 26 days.

(21) Appl. No.: 09/732,323

(22) Filed: Dec. 7, 2000

(65) Prior Publication Data

US 2001/0003323 A1 Jun. 14, 2001

(30) Foreign Application Priority Data

Dec. 8, 1999 (DE) .......................................... 199 59 085

(51) Int. Cl.[7] .............................. F16D 3/12; F16D 3/66; F16D 3/80
(52) U.S. Cl. .......................................... 192/212; 464/67
(58) Field of Search ........................ 192/70.17, 55.61, 192/212, 55.4, 208; 464/67

(56) References Cited

U.S. PATENT DOCUMENTS 5,242,328 A * 9/1993 Friedmann et al. ......... 192/212
5,518,100 A * 5/1996 Birk et al. .................. 192/212
6,217,451 B1 * 4/2001 Kooy et al. .................. 464/67

FOREIGN PATENT DOCUMENTS

| DE | 39 09 892 | 10/1989 |
| DE | 41 17 579 | 12/1991 |
| DE | 41 17 580 | 12/1991 |
| DE | 41 17 584 | 12/1991 |

* cited by examiner

*Primary Examiner*—Rodney H Bonck
(74) *Attorney, Agent, or Firm*—Darby & Darby

(57) ABSTRACT

A device for damping torsional vibrations has two elements that are rotatable relative to each other. One of the elements is connected to a motor, and the other element is connected to a gear box. A torsional vibration damper with energy accumulators is interposed between the elements to counteract a relative rotation between them. At least one of the elements is configured as a disc-like sheet metal part in which circumferentially extending mountings or pockets are formed to receive the energy accumulators. Press-formed support areas in the sheet metal part delimit the pockets in the circumferential direction and serve to introduce biasing forces into the energy accumulators. Impressed in the sheet metal part are circumferential grooves extending over at least part of the length of each pocket between the press-formed support areas.

19 Claims, 2 Drawing Sheets

DEVICE FOR DAMPING TORSIONAL VIBRATIONS

Figure 1:
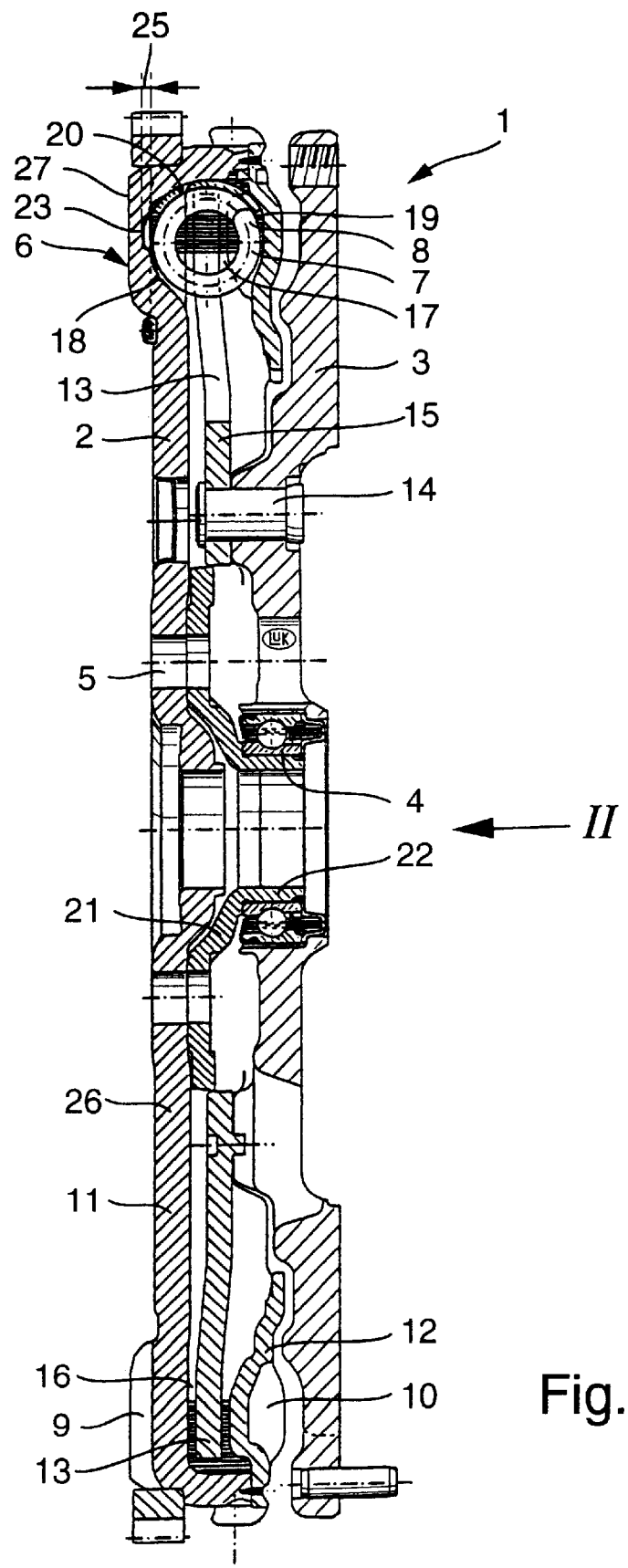

The invention relates to a device for damping torsional vibrations with at least two relatively rotatable elements of which one element is connectable with a motor and the other element is connectable with a gearbox and between the elements there is a torsion vibration damper which has energy accumulators and which counteracts the relative rotation between the two elements.

Devices of this kind are known for example through DE OS 39 09 892, DE OS 41 17 579, DE OS 41 17 580 and DE OS 41 17 584. With devices of this kind disc-like shaped sheet metal parts are very often used to hold and bias the energy accumulators which are provided between the two rotatable elements. In order to mount these energy accumulators the shaped sheet metal parts have shaped areas in which supporting or biasing regions are provided between the energy accumulators which are arranged in succession in the circumferential direction. The mountings for the energy accumulators are shaped so that guide regions are formed which are able to position the energy accumulators in the radial and/or in the axial direction. In many cases these radial and/or guide regions form axial indentations for the energy accumulators which are then housed at least in part in same.

As a result of the large material deformations or material displacements which are required in order to produce such disc-like or plate-like shaped sheet metal parts, stresses are generated in these component parts which cause distortion, deformation or curvature of the shaped sheet metal parts. It is therefore necessary in many cases to carry out secondary treatment on these shaped sheet metal parts, for example to carry out stock removing or thermal finishing treatment.

The object of the present invention is to configure disc-like or plate-like shaped sheet metal parts for devices of the kind mentioned at the beginning so that they have a high shape stability or shape resistance and tolerance to cold re-shaping steps, such as in particular pressing processes or drawing and imprinting operations.

According to the invention this is achieved in that in the extension region of the sections of the disc-like or plate-like shaped sheet metal part provided for mounting the energy accumulators, thus between the supporting or biasing regions for the energy accumulators, elongate impressed areas are created which extend in the circumferential direction at least in part over the length of the mounting sections for the energy accumulators which can be formed in particular by indentations. The measure according to the invention is particularly advantageous in the case of devices which have at most four circumferentially distributed energy accumulators which can be advantageously formed by coil compression springs. If only two energy accumulators are provided which each extend over 60 to 97% of half the circumference of the disc-like shaped sheet metal part and can be arranged diametrically opposite one another, the measure according to the invention has a particularly advantageous effect regarding the desired shape stability of the disc-like shaped sheet metal part. Disc like or plate-like shaped sheet metal parts of this kind have namely only two diametrically opposite biasing regions for the energy accumulators formed by impressed areas and producing stresses or inherent pressure strains in the shaped sheet metal part. These stresses cause the disc-like shaped sheet metal to be set up at a certain angle at the side of the impressed areas forming the supporting regions, so that an if only slight roof-shaped screen is formed. The sections of the disc-like shaped sheet metal part located at the side of the diametrically opposite biasing or supporting regions for the energy accumulators thus fold up together about a small angle like a book. By introducing elongate impressed areas according to the invention in the circumferential direction between the supporting regions for the energy accumulators, stresses such as in particular inherent pressure stresses are likewise built up in the material and counteract the stresses which are produced by imprinting the supporting regions. Distortion or a roof-shaped formation of the disc-like shaped sheet metal part can thereby be avoided, or at least reduced to an acceptable level The impressed areas can be formed and shaped in a particularly advantageous way so that they mainly create material displacements, thus an internal flow of the material. Advantageously a compression of the material can take place and furthermore cold-solidification can also occur. Through the design of a disc like or plate-like shaped sheet metal part according to the invention it is also possible to guarantee a greater stability or stiffness of the component part. Since the corresponding component part can be made overall to keep within its dimensions or with substantially smaller shape tolerances, in many cases secondary finishing, such as for example stock-removing or rolling is no longer necessary.

In a particularly advantageous way the elongate impressed areas can be created in the sheet metal so that they cause a reduction in the material thickness of the shaped sheet metal part compared with the thickness of the regions adjoining the impressed areas. Advantageously the elongate impressed areas are formed in the sheet metal so that they form or produce no or practically no axial material projection on the side of the shaped sheet metal part facing away from same.

It can be particularly advantageous if the elongate impressed areas are introduced from the same side of the shaped sheet metal part as the molded areas, such as in particular the axial indentations for mounting the energy accumulators. With a design of this kind the elongate or swage-like impressed areas can thus change directly into indentations or areas for mounting and guiding the energy accumulators. It can be particularly advantageous it the elongate impressed areas extend at least over 30% of the angular extension of the energy accumulators or indentations. The length of the impressed areas can thereby amount to 0.3 to 0.95 times the angular extension of the energy accumulators. The radial width of the elongate indentations can be in the order of from 10 to 30% of the external circumference of the energy accumulators which are to be mounted. Advantageously the elongate indentations can be configured so that their maximum impressed depth amounts to 10 to 30% of the thickness originally present in the region of the sections of the shaped sheet metal part adjoining the impressed areas. Although it can be advantageous if the elongate impressed areas have the same depth over practically their entire extension, in many cases it can also be expedient if these impressed areas or the base of these impressed areas have a path of changing depth. Viewed in cross-section the impressed areas can thereby be U-shaped, V-shaped, curved or another shape. It can also be expedient if several elongate impressed areas are formed in the shaped sheet metal part extending parallel to each other.

In order to produce and maintain the shape of a shaped sheet metal part according to the invention it can be particularly advantageous if in the region of a mounting or indentation for an energy accumulator there is a single impressed area. In many cases however it can also be expedient if in the region of a mounting or indentation of this kind there are several sector-shaped impressed areas arranged in succession in the circumferential direction.

In a particularly advantageous way the device according to the invention for damping torsional vibrations can be a constituent part of a so-called twin-mass flywheel or can even form same. A shaped sheet metal part designed according to the invention can thereby form a constituent part of at least one of the flywheel masses. Advantageously the device can have two relatively rotatable flywheel masses of which one is connectable to an output shaft of an internal combustion engine and the other is connectable to a gearbox, preferably through a friction clutch. The two flywheel masses can thereby be positioned rotatable coaxial with each other through a bearing.

In a particularly advantageous way the shaped sheet metal part designed according to the invention can have a flange-like radially aligned region which has radially inside an axial integral shoulder for mounting the bearing. This axial shoulder can be produced by flow pressing. For mounting the bearing this axial shoulder must have a very high precision with regard to its roundness. This is particularly important when a slide bearing is used to form the bearing. By introducing the elongate impressed areas according to the invention in the region of the radially outer spring mountings a significantly narrower tolerance is obtained with regard to the roundness of the axial shoulder. This is due to the fact that as a result of introducing the elongate impressed areas according to the invention the shaped sheet metal part cannot become distorted so that an oval deformation of the axial shoulder on leaving the imprinting tool is avoided or at least reduced to an acceptable measure. A comparison between the shaped sheet metal parts without the impressed areas according to the invention and those having the impressed areas according to the invention has shown that the non-roundness in the region of the axial shoulder or bearing seat can be reduced by 50%. Thus a shaped sheet metal part without the impressed areas according to the invention would have an out-of-roundness of 0.04 mm, whilst a shaped sheet metal part provided with the impressed areas according to the invention would only have an out-of-roundness of less than 0.01 mm. Too much non-roundness in the region of the bearing seat or axial shoulder causes on the one hand great difficulty in mounting the bearing and on the other increased friction or increased torsional resistance inside the bearing. This can lead in the case of twin-mass flywheels to problems occurring at least during the operation in the idling area of the combustion engine equipped with such a twin-mass flywheel.

Advantageously the disc-like or plate-like shaped sheet metal part can be connected directly to the output shaft of an internal combustion engine. To this end this shaped sheet metal part can have screw holes which are arranged on a larger diameter than the external diameter of the axial shoulder or bearing.

The regions of the shaped sheet metal part forming the mountings or indentations for the energy accumulators can advantageously form an axial shoulder on which a radially inwardly extending wall is fixed which together with this shaped sheet metal part defines a ring-shaped chamber which is sealed at least radially on the outside and which extends at least over the radial extension of the energy accumulators or the mountings for same. Advantageously this wall can also be formed as a shaped sheet metal part and can have mounting areas or indentations and biasing areas for the energy accumulators. If the additional wall is formed by a shaped sheet metal part then it is expedient if this also has elongate impressed areas which can he formed and arranged like those of the disc like or plate-like shaped sheet metal part.

In order to compress the energy accumulators which are mounted in the ring-shaped chamber a flange body can advantageously be provided which extends at least with biasing regions for the energy accumulators from radially inside into the ring-shaped chamber and which is in driving connection by radially further inner areas to the other flywheel mass mounted on the gearbox side. This drive connection can be produced either through a rigid connection, through a force-locking connection, such as for example a slip clutch, or however through a further rotationally elastic damper.

With regard to the basic shaping, arrangement and functioning of a shaped sheet metal part designed according to the invention, reference is made to the prior art already mentioned whose contents are to be regarded expressly as integrated in the present application, so that a detailed description of different devices for damping torsional vibrations can be omitted from the present application.

Figure 2:
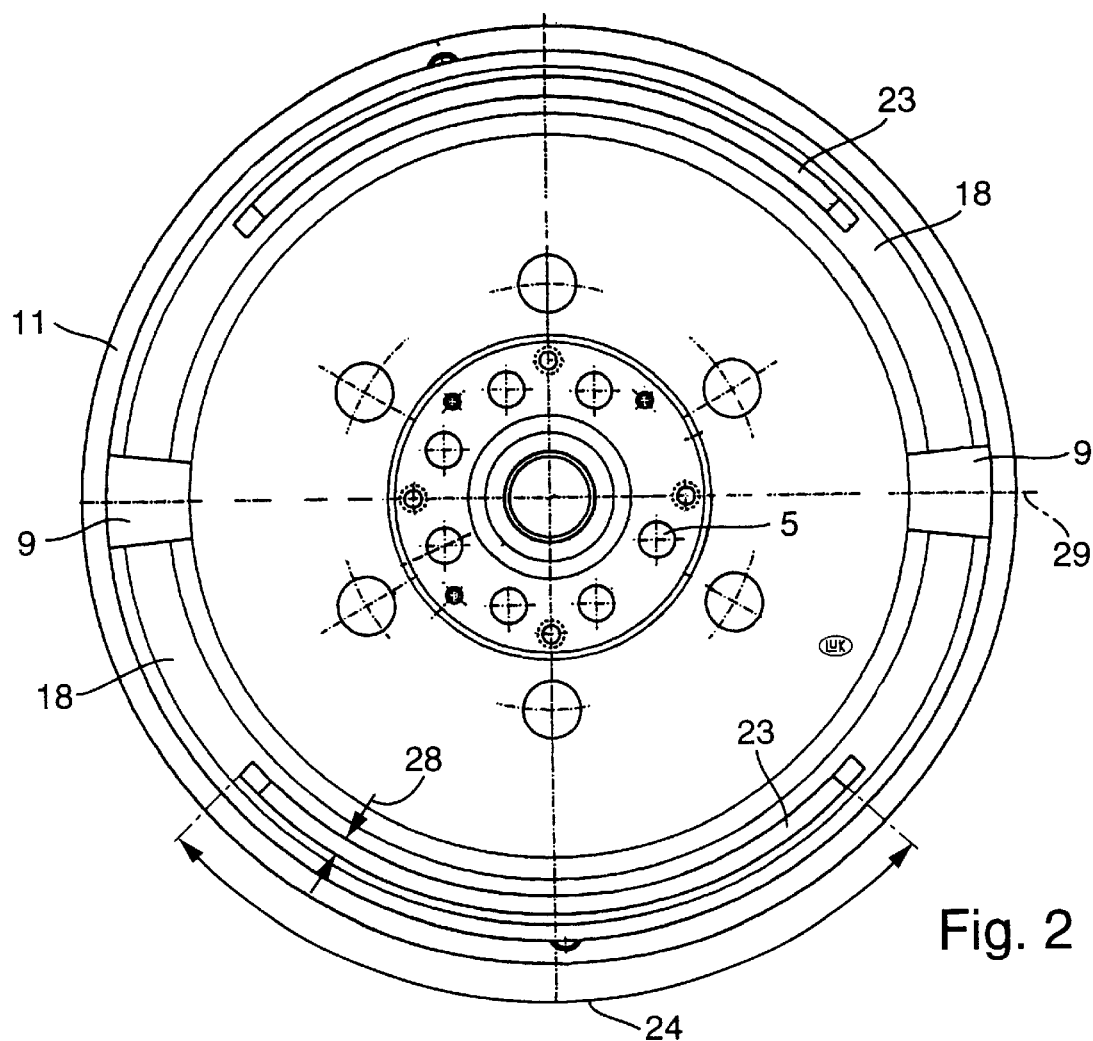

The invention will now be explained in further detail with reference to the drawings in which:

FIG. 1 shows a sectional view through a device designed according to the invention for damping torsional vibrations, and FIGS. 2/3 each show a view in the direction of part II of FIG. 1 of a shaped sheet metal part which can be used in the device according to FIG. 1.

The torsion vibration damper shown in part in FIG. 1 forms a divided flywheel 1 which has a first or primary flywheel mass 2 fixable on an output shaft (not shown) of an internal combustion engine, as well as a second or secondary flywheel mass 3. A friction clutch is fixable on the second flywheel mass 3 with the interposition of a clutch disc through which an input shaft (likewise not shown) of a gearbox can be coupled and uncoupled. The flywheel masses 2 and 3 are mounted rotatable relative to each other through a bearing 4 which in the illustrated embodiment is arranged radially inside holes 5 for passing through the fixing screws for mounting the first flywheel mass 2 on the drive shaft of an internal combustion engine. A damping device 6 comprising the energy accumulators 7 of which at least one is formed by at least one coil compression spring 8, is active between the two flywheel masses 2 and 3.

The two flywheel masses 2 and 3 have biasing areas 9, 10 for the energy accumulators 7. With the illustrated embodiment the biasing areas 9, 10 are formed by impressed areas formed in the sheet metal parts 11, 12 which are used to make the first flywheel mass 2. The biasing areas 13 provided axially between the biasing areas 9, 10 are formed by at least one flange-like biasing part 15 connected to the secondary flywheel mass 3, for example by rivets 14. This component part 15 serves as a torque transfer element between the energy accumulators 7 and the flywheel mass 3. The biasing areas 13 are formed by radial arms or extension arms 13 provided on the outer circumference of the flange-like biasing component part 15. The component part 11 which is made for example by cold-reshaping sheet metal serves to fix the first flywheel mass 2 or the entire divided flywheel 1 on the output shaft of an internal combustion engine. Radially on the outside the component part 11 is sealingly connected, for example by welding to the component part 12 which is likewise made from sheet metal. The two component parts 11 and 12 form a ring-shaped space 16 which has or forms at least one toroidal area 17. The ring-shaped space 16 or the toroidal area 17 can be filled at least in part with a viscous medium such as for example grease. Viewed in the circumferential direction between the shaped areas or the biasing areas 9, 10 the component parts 11, 12 form mountings or indentations 18, 19 which define the toroidal area 17 and hold the energy accumulators 7, as well as here guide the latter both in the radial and axial direction. At least when the device 1 rotates the springs 8 are supported by the areas of the component part 11 and/or 12 which define the ring-shaped or toroidal area 17 radially on the outside. With the illustrated embodiment a wear-protection device 20 is formed by at least one hardened intermediate sheet metal layer or sheet metal insert on which at least the springs 8 are radially supported. The wear protection device 20 extends circumferentially advantageously at least over the entire length or the relaxed energy accumulator 7. As a result of the support through centrifugal force of at least the springs 8, speed-dependent friction damping is produced in the event of a change in length or compression of the energy accumulators 7 or of the coil springs.

Radially on the inside the radially extending component part 1 supports an intermediate part or a hub 21 which holds or supports the inner bearing ring of the ball bearing 4. The outer bearing ring of the ball bearing 4 supports the flywheel mass 3.

Instead of a rolling bearing 4 it is however also possible to use a slide bearing, such as is described for example in various forms in DE 198 34 728 A1. Furthermore the axial shoulder 22 formed by the intermediate part 21 of the bearing 4 can also be shaped directly on the sheet metal part 11.

The housing or shaped sheet metal part 11 has in the region of the mountings or indentations 18 for the springs circumferentially extending elongate impressed areas 23 which are made during manufacture of the shaped sheet metal part 11.

As can be seen from FIG. 2, the elongate impressed areas 23 extend over a length of an angle 24 of about 95° along the spring mountings 18 of the component part 11. The impressed areas 23 are thereby mounted at least approximately in the middle between the two diametrically opposite biasing areas 9. Depending on the type of use the extension 24 of the impressed areas 23 can extend over about 0.3 to 0.95 times the angular extension of a spring mounting 18. If only one single impressed area 23 is provided in the region of the spring mounting 18 then it is expedient if this is arranged at least approximately centrally to the biasing areas 9. The depth of an impressed area 23 marked by 25 in FIG. 1 amounts advantageously to about 10 to 30% of the material thickness of the sheet metal used. This material thickness corresponds roughly to the illustrated thickness of the radial area 26 of the sheet metal part 11.

As can also be seen from FIG. 1, no material projection is formed on the side 27 of the sheet metal part 11 facing away from the spring mounting 18 through imprinting the impressed areas 23.

With the embodiment of the shaped sheet metal part 11 illustrated in FIG. 1 the latter has in the radial extension area of the spring mountings 18 a reduced thickness compared to the thickness present in the radial area 25 of this sheet metal part. This reduced thickness can be produced during the imprinting process of the component part 11 or however can also be cleared away afterwards for example by stock-removal work.

The radial width of the elongate or swage-like impressed areas 23 marked by 28 in FIG. 2 can be in the order of 10 to 40% of the outer diameter of a coil spring 8.

When making the shaped sheet metal part 11, imprinting biasing areas 9 causes inherent pressure strains in the shaped sheet metal part. These strains have the tendency to deform the disc-like shaped sheet metal part 11 along the axis 29 in FIG. 2 so that it folds up at the sides of the axis 29 (similar to a book) There is thus the tendency for the component part 11 to form an obtuse angle in relation to the axis 29. By introducing impressed areas 23 additional inherent pressure strains are introduced into the component part 11 which counteract the inherent pressure strains produced by introducing the biasing areas 9 so as to prevent, or at least reduce to an acceptable level, the aforesaid rising up of the areas of the component part 11 alongside the axis 29.

Figure 3:
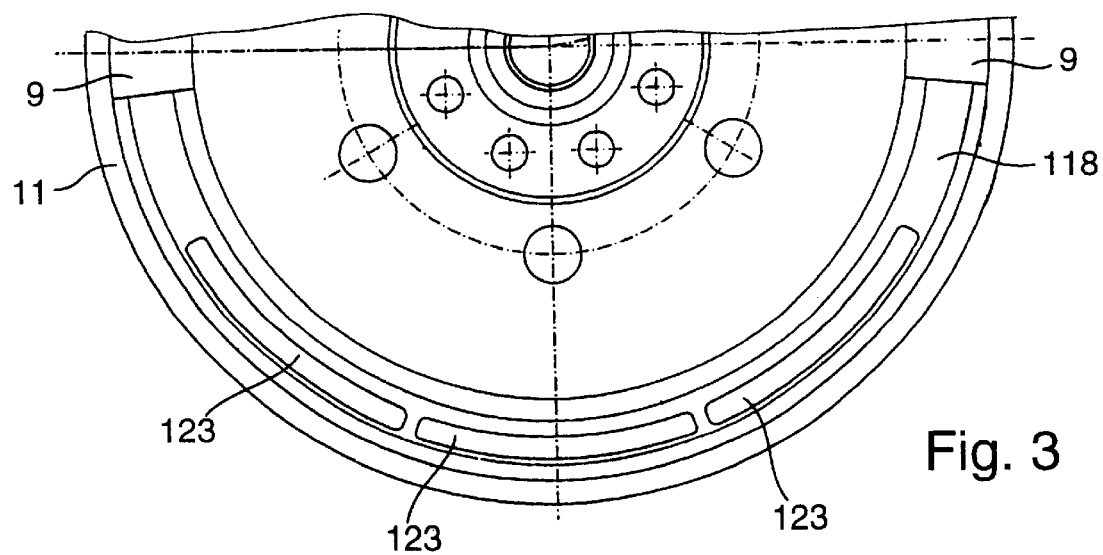

With the embodiment of a sheet metal component part 11 illustrated in part in FIG. 3, several elongate impressed areas 123 are provided in the region of a mounting 118 for the spring. The impressed areas 123 are thereby arranged circumferentially in succession whereby the angular distribution of these impressed areas 123 is likewise such that they are at least substantially symmetrical relative to the diametrically opposite biasing areas 9.

With the embodiment illustrated in FIG. 1, the illustrated impressed area 23 has a U-shaped cross-section. This cross-section can however also have a different shape, for example can be curved or V or W shaped. Also several circumferentially extending impressed areas of a smaller radial width could be provided running parallel to each other.

Other shapes are also possible for the impressed areas 23 to prevent deformation of the component part 11 as a result of the strains produced by the impressed area 9.

The component part 12 can also have advantageously shaped areas 23 in the region of the spring mountings 19, The patent claims filed with the application are proposed wordings without prejudice for obtaining wider patent protection. The applicant retains the right to claim further features disclosed up until now only in the description and/or drawings.

References used in the sub-claims refer to further designs of the subject of the main claim through the features of each relevant sub-claim; they are not to be regarded as dispensing with obtaining an independent subject protection for the features of the sub-claims referred to.

The subjects of these sub-claims however also form independent inventions which have a design independent of the subjects of the preceding claims.

The invention is also not restricted to the embodiments of the description. Rather numerous amendments and modifications are possible within the scope of the invention, particularly those variations, elements and combinations and/or materials which are inventive for example through combination or modification of individual features or elements or process steps contained in the drawings and described in connection with the general description and embodiments and claims and which through combinable features lead to a new subject or to new process steps or sequence of process steps insofar as these refer to manufacturing, test and work processes.

What is claimed is:

1. Device for damping torsional vibrations having at least two elements rotatable relative to each other of which one element is connectable to a motor and the other element is connectable to a gearbox, and between the elements there is a torsion vibration damper which counteracts a relative rotation of the elements and which has energy accumulators, wherein at least one of the elements is formed by at least one disc-like shaped sheet metal part which has radially on the outside circumferentially extending mountings for the energy accumulators, wherein viewed in the circumferential direction impressed support areas for the energy accumulators are provided between the mountings, characterised in that viewed in the circumferential direction and in the extension region of the mountings elongate impressed areas are formed in the shaped sheet metal part between the support areas and extend at least in part over the length of the mountings.

2. Device according to claim 1, wherein in the region of the elongate impressed areas the material thickness of the shaped sheet metal part is less than the thickness of the regions adjoining the impressed areas.

3. Device according to claim 1, wherein on the side of the shaped sheet metal part facing away from the elongate impressed areas there is no or practically no axial material projection formed by the impression of the elongate impressed areas.

4. Device according to claim 1, wherein the elongate impressed areas are impressed from the same side of the shaped sheet metal part as the axial indentations forming the mountings in this shaped sheet metal part.

5. Device according to claim 1, wherein the elongate impressed areas extend at least over 30% of the angular extension of the mountings.

6. Device according to claim 1, wherein the angular length of the elongate impressed areas amounts to 0.3 to 0.95 times the angular extension of the mountings.

7. Device according to claim 1, wherein the impressed depth of the elongate impressed areas amounts to 10 to 30% of the material thickness present in the region of the mountings.

8. Device according to claim 7, wherein the depth of the elongate impressed areas amounts to about 20% of the material thickness in the region of the mountings.

9. Device according to claim 1, wherein a single impressed area is provided in the region of one mounting.

10. Device according to claim 1, wherein several sector-shaped impressed areas are arranged one behind the other in the circumferential direction in the region of one mounting.

11. Device according to claim 1, in the form of a so-called twin-mass flywheel wherein the shaped sheet metal part is a constituent part of one of the flywheel masses.

12. Device according to claim 1, having two relatively rotatable flywheel masses of which one is connectable with the output shaft of an internal combustion engine and the other is connectable with a gearbox, with the two flywheel masses being positioned rotatable coaxially with each other through a bearing.

13. Device according to claim 12, wherein the shaped sheet metal part has radially on the inside an axial shoulder for mounting the bearing.

14. Device according to claim 13, wherein the shoulder is an integral constituent part of the shaped sheet metal part.

15. Device according to claim 13, wherein the shaped sheet metal part has screw holes which are arranged on a larger diameter than the external diameter of the axial shoulder of the bearing.

16. Device according to claim 12, wherein one flange body connected to the other flywheel mass extends at least with biasing areas for the energy accumulators from radially inside into the ring-shaped chamber.

17. Device according to claim 12, wherein said other of the flywheel masses is connectable with said gearbox through a friction clutch.

18. Device according to claim 1, wherein the shaped sheet metal part has radially on the outside an axial shoulder on which a radially inwardly extending wall is fixed which together with the shaped sheet metal part defines a ring-type chamber which is sealed at least radially on the outside and which extends at least over the radial extension of the mountings for the energy accumulators.

19. Device according to claim 1, wherein the mountings are formed by impressed indentations.

* * * * *